April 21, 1953   W. M. POWELL ET AL   2,635,339
METHOD OF AND APPARATUS FOR STEREOSCOPIC
RECOMPOSING AND MEASURING
Filed March 8, 1949   6 Sheets-Sheet 1

INVENTORS.
WILSON M. POWELL
HERMAN PAUL HERNANDEZ, Jr.
BY Roland A. Anderson
ATTORNEY.

April 21, 1953  W. M. POWELL ET AL  2,635,339
METHOD OF AND APPARATUS FOR STEREOSCOPIC
RECOMPOSING AND MEASURING
Filed March 8, 1949  6 Sheets-Sheet 2

INVENTORS.
WILSON M. POWELL
HERMAN PAUL HERNANDEZ, Jr.
BY Roland A. Anderson
ATTORNEY.

INVENTORS.
WILSON M. POWELL
HERMAN PAUL HERNANDEZ, Jr.
BY
Roland A. Anderson
ATTORNEY.

April 21, 1953

W. M. POWELL ET AL 2,635,339

METHOD OF AND APPARATUS FOR STEREOSCOPIC
RECOMPOSING AND MEASURING

Filed March 8, 1949

INVENTORS.
WILSON M. POWELL
HERMAN PAUL HERNANDEZ, Jr.

BY
Roland A. Anderson
ATTORNEY.

Patented Apr. 21, 1953

2,635,339

UNITED STATES PATENT OFFICE 2,635,339

METHOD OF AND APPARATUS FOR STEREOSCOPIC RECOMPOSING AND MEASURING

Wilson M. Powell, Berkeley, and Herman Paul Hernandez, Jr., San Francisco, Calif., assignors to the United States of America as represented by the United States Atomic Energy Commission Application March 8, 1949, Serial No. 80,304

13 Claims. (Cl. 33—1)

This invention relates to a new and improved method of and apparatus for studying the path, behavior, and identification of an ion traveling through space. More particularly, it pertains to the recomposing of a stereopair, such as a stereopair taken by conventional camera means and showing the phenomena occurring in a conventional cloud chamber. It also further relates to a new and improved method of and apparatus for measuring ion paths.

In recent years a great amount of knowledge of nuclear phenomena has been derived from study of the behavior of ions in cloud chambers. The degree to which the use of this apparatus can be extended, however, is largely dependent upon the speed and accuracy with which the associated photographic and reproduction equipment can be employed. In particular, the visual reproduction in full scale size of the precise path in three-dimensional space of an ion under observation is most important, especially when it is desired to make a rapid, direct measurement of that path. Such an observation may desirably involve not only the identification of a charged ion, such a proton, deuteron, meson, alpha particle, beta particle, or the like, or the nature of its path, such as its radius of curvature, angle of departure, length of path, or thickness of path, but also may involve the behavior of numbers of ions involved in certain nuclear reactions such as occurs in scattering. As a consequence, even though adequate photographic records, such as stereopairs, can usually be produced in connection with cloud chamber operations, the value of such records is in the last analysis dependent upon the accuracy and ease with which they can be recomposed in their proper relation for study. This study heretofore has frequently entailed a tedious and slow procedure in recomposing the image, involving in some cases, difficult, awkward and eye-straining manipulations of the stereopairs. It therefore is an object of the present invention to provide a new and improved apparatus for recomposing stereopairs and for overcoming limitations found in conventional stereoscopic reproducing equipment.

Another object is to provide a method for reproducing in three dimensional space a visual image of a photographed path of a particle which is identical in size and relative location to such path at the instant it was photographed.

Another object is to provide a method and means for directly measuring in full scale the path of a particle passing through three-dimensional space.

Another object is to provide a new and improved combination of method and apparatus for the recording, under a given set of optical conditions, of a full size visual image of the path of a particle in space and the recomposing in full size of the image under a substantially identical set of optical conditions.

A further object is to provide a compact and rugged apparatus for measuring in three dimensions the path of a particle passing through three-dimensional space.

A further object is to provide a new and improved means for quickly adjusting lens and film in a stereoscopic projector.

A still further object is to provide a new and improved viewing and measuring screen for a stereoscopic projector.

Still another object is to provide an improved mounting for the measuring screen of a stereoscopic projector.

Other objects and advantages of the invention will become more apparent as the description proceeds when considered in conjunction with the accompanying drawings, in which.

Figure 1:
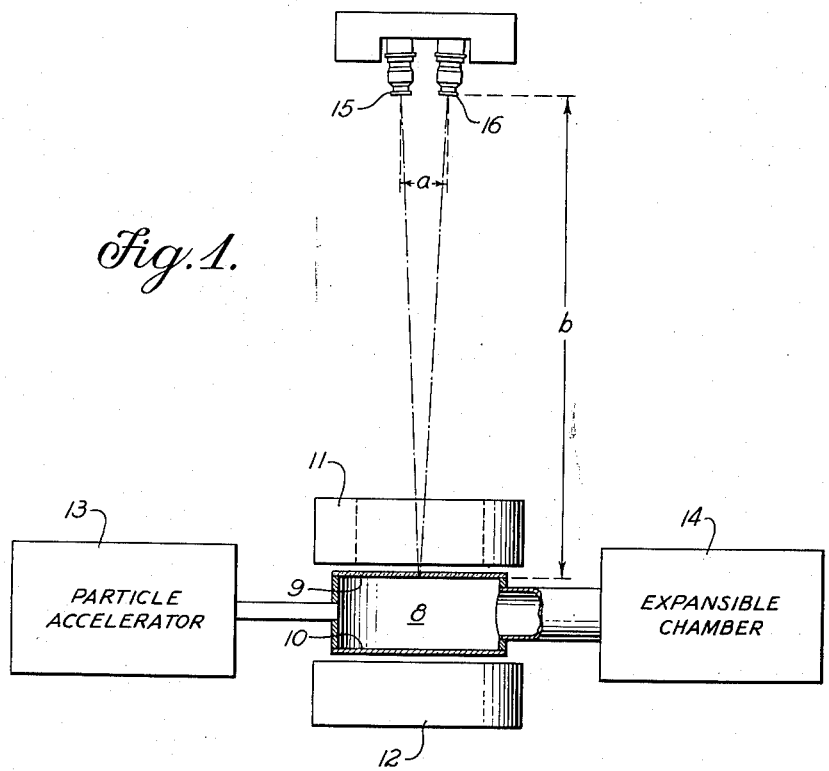
Figure 1 is a schematic view showing one arrangement of apparatus for making a photographic record of phenomena occurring in a cloud chamber.

In Fig. 1 is shown a conventional arrangement of a cylindrical cloud chamber 8 having top and bottom surfaces 9 and 10 respectively, said chamber being mounted in the field of cooperating magnets 11 and 12 and receiving from any suitable particles accelerator 13 charged particles whose behavior it is desired to study. The customary expansible chamber and heat exchanger means indicated diagrammatically at 14 in cooperation with the cloud chamber may be coordinated in any suitable manner with the stereoscopic camera lens 15 and 16 to the end that a stereopair may be produced at an appropriate instant. As is customary, the upper surface 9 of the chamber may comprise a glass member bearing suitable reference markings and the lower surface 10 may comprise a suitable member preferably covered with a light absorbing material. In certain constructions wherein the expansible chamber is located beneath the main chamber body this surface may take the form of a black velvet screen. It is to be noted that in order to utilize the present invention most effectively a substantial duplication of the geometry and the optical conditions obtaining at the instant the stereopair is produced must be provided at the time when such pair is recomposed for study. As a consequence the distance $a$ between the centers of lens 15 and 16, the distance $b$ through the medium of air between such lens and the upper glass surface 9 of the cloud chamber 8, and the quality and thickness of such glass are closely duplicated in the projector apparatus later to be described. As will further be noted, full scale reference lines or other data, such as the marks 102 shown on the surface of a screen 175, preferably are etched or otherwise incorporated in the surface 9 of the cloud chamber in order that the two views of the stereopair may later be adjusted relative to each other and to said viewing screen in full size relation.

Figure 2:
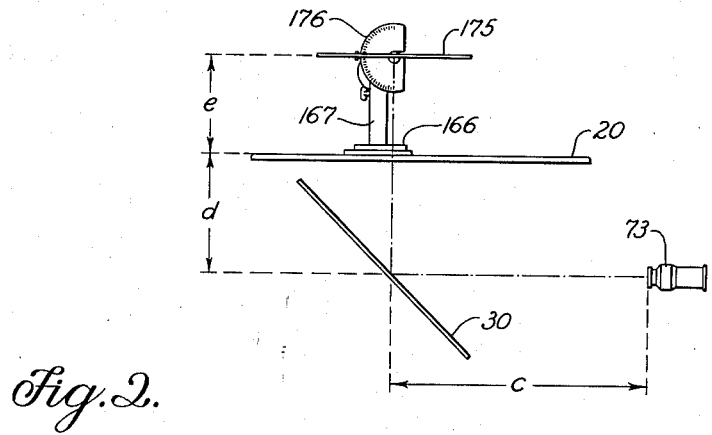
Fig. 2 is a diagrammatic view illustrating the relationship of apparatus employed in recomposing the photographic record taken by the apparatus of Fig. 1.

As indicated diagrammatically in Fig. 2, apparatus for carrying out the invention is preferably arranged for compactness and rigidity, as well as for convenience of the individual studying the stereopair. In general, this result may be achieved, without sacrifice of optical characteristics by use of a horizontally disposed stationary work table 20 of convenient height and having a glass top optically equivalent to the upper glass surface 9 of the cloud chamber. Positioned upon table 20 is a movable support 166 carrying thereon the improved viewing and measuring screen 175 later to be described in detail. Such screen normally is positioned at a standard distance $e$ above the surface of table 20 at the beginning of any measuring operations. Interposed between a projector lens 73 and the bottom of table 20 and at distances $c$ and $d$ respectively therefrom is a suitable reflecting means 30. As a result of this combination of apparatus, it will be noted that a ray of light passing through a projector lens 73 travels through air a distance substantially equal to the sum of $c$, $d$ and $e$ which in turn is equal to the distance $b$ traveled by a ray of light which produced the photographic record. It will further be noted that the respective rays likewise have traveled through the same distance of optically equivalent glass, in one case through the glass table top 20, in the other case through the glass top surface of cloud chamber 8. Although air and glass are mentioned as being the mediums through which such rays travel, the invention in no way is intended to be limited thereto and in its broader aspects may be employed using other gaseous, solid or liquid mediums.

Figure 3:
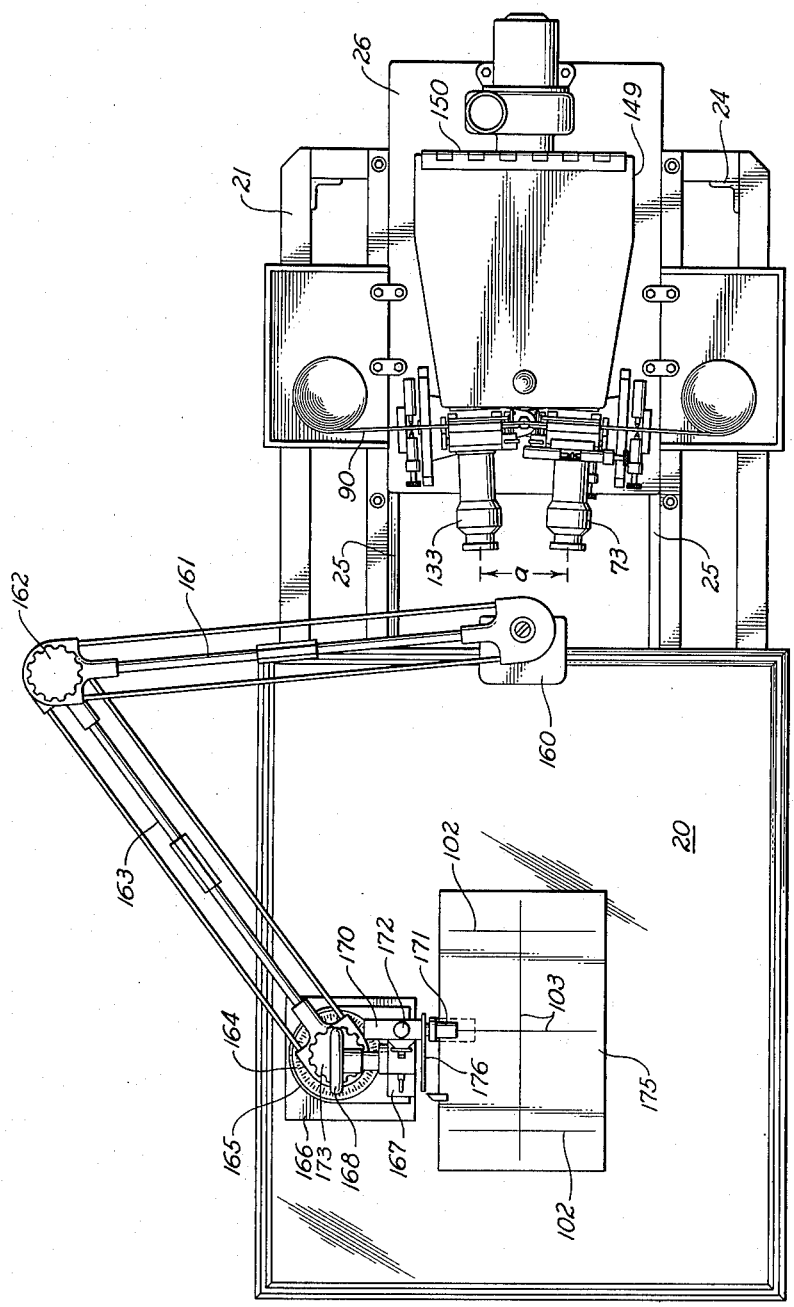
Fig. 3 is a plan view of stereoscopic apparatus suitable for carrying out the invention.
Figure 4:
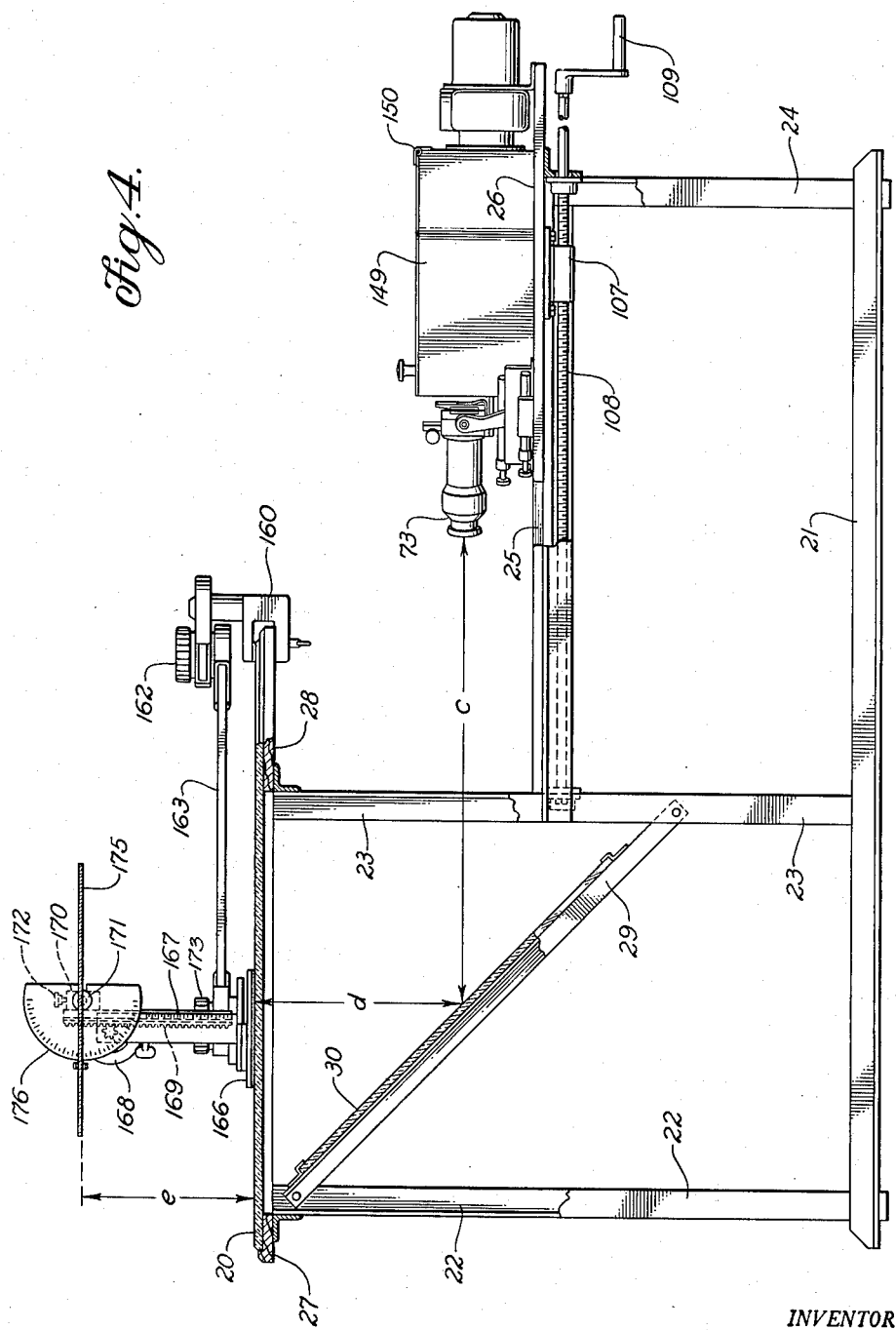
Fig. 4 is a side elevation of the apparatus shown in Fig. 3 with portions shown in section and with the measuring screen at a location corresponding to a full size image reference point.

Passing now to Figs. 3 and 4, showing a preferred form of apparatus used in our invention, it will be noted that a rigid framework is provided comprising a base member 21, pairs of rigid uprights 22, 23 and 24 and a pair of horizontally disposed guide tracks 25. Adapted for sliding movement along said tracks is a base plate 26 upon which is mounted the stereoscopic projecting means employed in reproducing the stereopairs for study. The position of plate 26 on tracks 25 may be selectively adjusted and the plate retained in a selected position by means of a bracket 107 depending from the plate and engaging a threaded rod 108. This rod may be mounted for rotation in supports affixed to tracks 25 and may be actuated by means of a crank 109. A suitable table top frame 27 mounted upon uprights 22 and 23 and having an overhanging portion 28 may also be provided for retaining the transparent glass table top 20 in the desired location and for furnishing a convenient support to measuring apparatus cooperating therewith. By means of a rigid cross member 29 extending between uprights 22 and 23 the reflector 30 is retained in a position for reflecting light rays from the projecting apparatus upwardly through the glass 20. Reflector 30 may be formed of any suitable material, such as glass having a polished aluminized surface. It is to be noted that the reflecting surface is located on the side of the reflector nearer the source of the rays so that such rays are not refracted in any way and the desired optical characteristics as outlined with respect to Figs. 1 and 2 are thus maintained.

Any suitable housing or light shielding means, not shown, may be arranged around the uprights 22 and 23 in order to prevent dust, moisture or light from extraneous sources from entering the space beneath table top 20. In certain cases this purpose can easily be accomplished by use of heavy, dark cloth screens, such as are frequently employed in photographic work.

Figure 5:
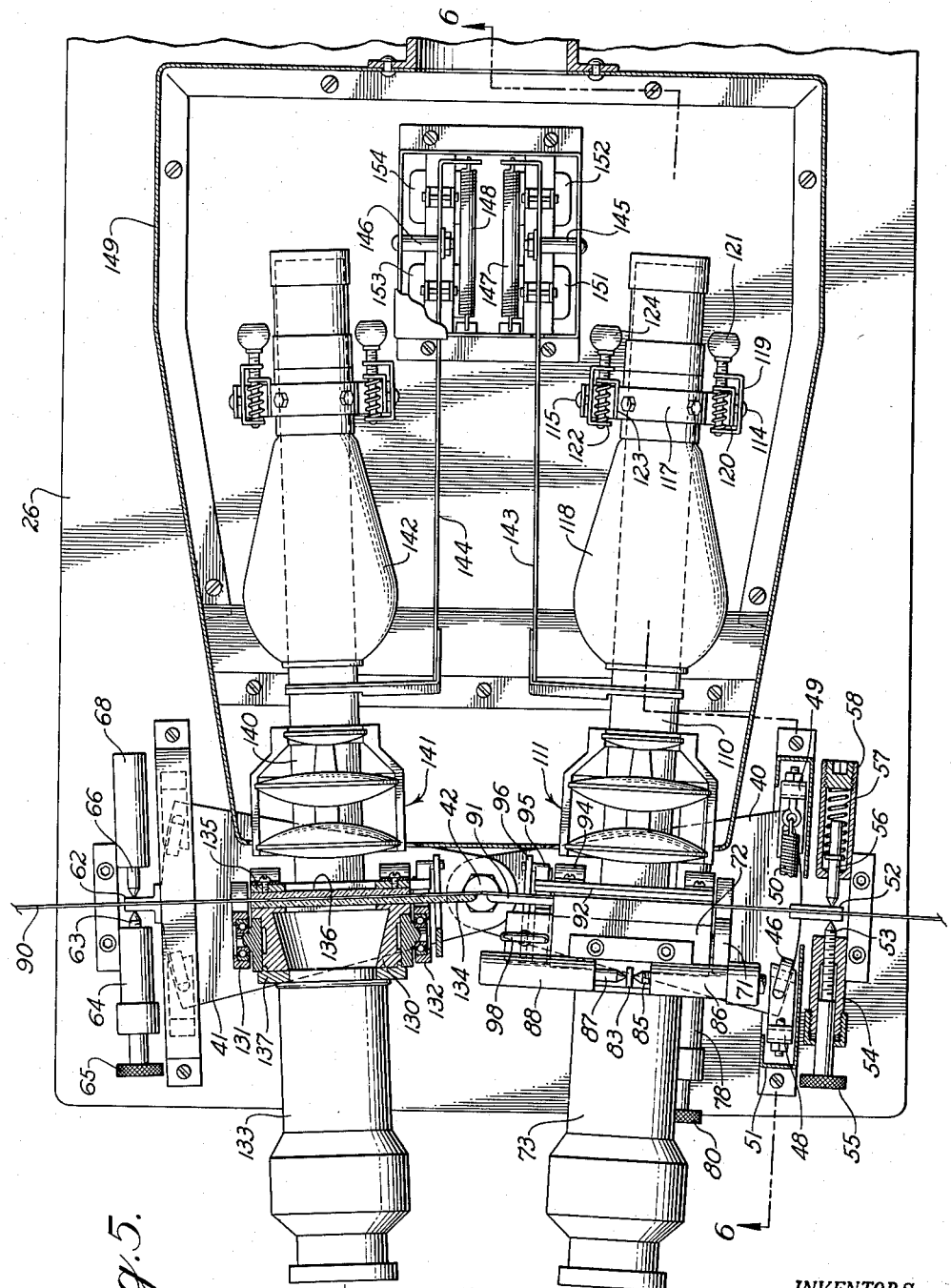
Fig. 5 is a plan view, partly in section, showing the general arrangement of the stereoscopic projector apparatus.
Figure 6:
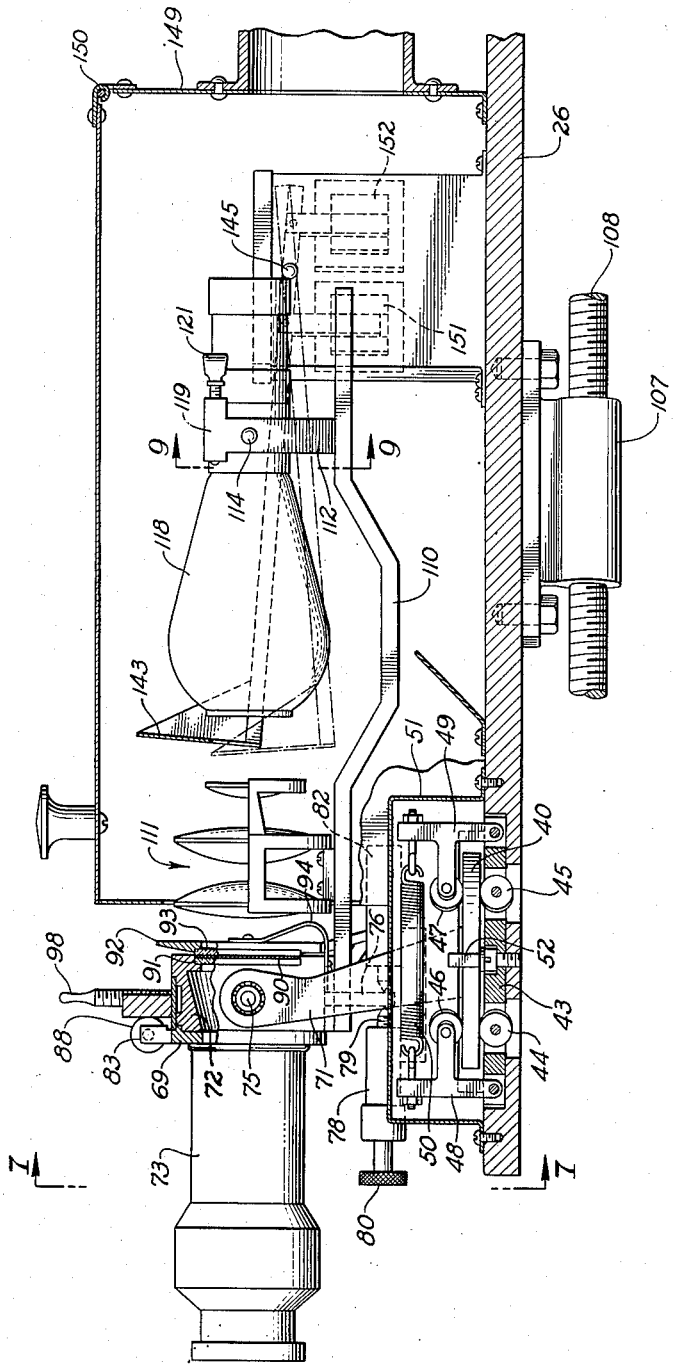
Fig. 6 is a side elevation, partly in section, of one of the projectors shown in Fig. 5, taken along line 6—6 of Fig. 5.
Figure 8:
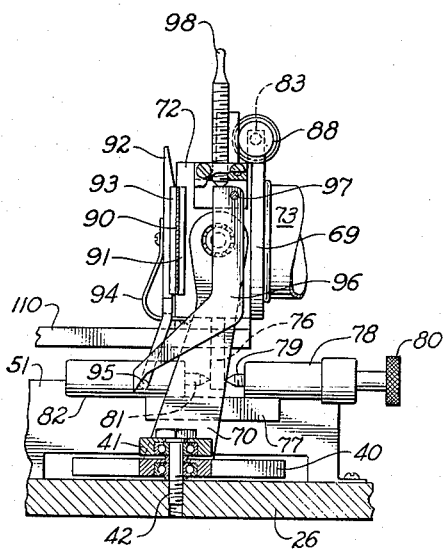
Fig. 8 is a detail view, in side elevation, of the lens adjusting means shown in Fig. 7.

Referring now to the projecting means, it will be noted that a separately mounted and adjustable projector group is provided for each member of the stereopair. As shown in Fig. 5, fan shaped support plates 40 and 41 are commonly mounted with suitable anti-friction bearings upon a bearing post 42 located centrally of base plate 26. Adjacent the outer extremity of support plate 40, shown in Fig. 6, a bearing housing 43 carrying lower bearing rolls 44 and 45 and upper bearing rolls 46 and 47 mounted respectively upon pivoted arms 48 and 49 serves to provide a substantially frictionless mounting for the support plate 40 and the load which it bears. A suitable tension spring 50 extending between the upper extremities of arms 48 and 49 exerts pressure to keep the plate 40 from rocking and a suitable shield 51 serves to partially enclose the bearing housing. Extending from an outer edge of support plate 40 is an upstanding web 52 providing a convenient means for rotating the plate 40 about its pivot on post 42. For effecting this rotation a rotatable screw threaded pin 53 mounted in a stationary frame 54 affixed to base plate 26 is turned manually or otherwise, as by means of a knob 55. For holding support plate 40 in a desired adjusted position a cooperating pin 56 bearing upon the opposite side of web 52 and pushed outwardly by compression spring 57 mounted in housing 58 is provided.

As best shown in Fig. 5, a similar apparatus for effecting the desired movement of support plate 41 may be employed whereby a web 62 attached to said plate is actuated by a screw threaded member 63 housed in a stationary frame 64 affixed to base plate 26. For adjusting member 63 a manually operable knurled knob 65 may be used. Similarly, a spring pressed pin 66 contained in housing 68 may be provided to hold support plate 41 in the desired adjusted position.

Figure 7:
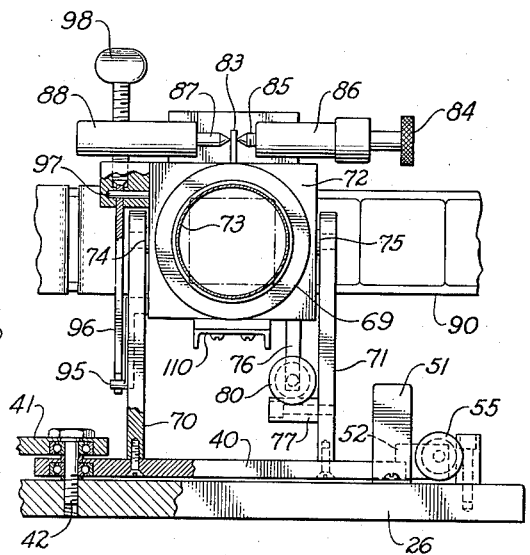
Fig. 7 is an end elevation, partly in section, taken along line 7—7 of Fig. 6.
Figure 9:
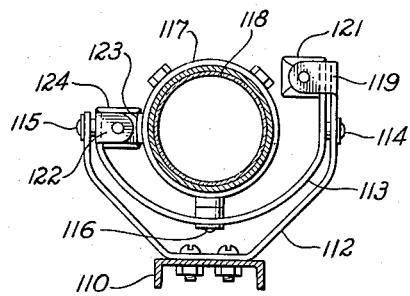
Fig. 9 is a detail view of the lamp gimbal taken along line 9—9 of Fig. 6.

Referring now to Fig. 7 it will be seen that rigid supports 70 and 71 affixed at their lower ends to plate 40 provide a mounting for a suitable hollow, box-like holder 72 in which a lens assembly 73, later to be described, is adjustably mounted for limited rotation. The holder 72 in turn is trunnioned as at 74 and 75 in the respective supports for adjustment in a generally vertical plane. Depending from the lower surface of the holder 72 is an arm 76 rigidly affixed to the holder and serving as a means for tilting the holder and its attached parts. Mounted upon a framework 77 secured to support 71 is a housing 78, within which a screw threaded pin 79, actuated in any suitable manner as by means of knob 80 is adapted to turn and to bear upon arm 76. For holding the arm in the desired adjusted position a second pin 81 bearing upon the opposite side of arm 76 and resiliently positioned in a second housing 82 which in turn is secured to framework 71 may be provided.

The lens assembly 73 may comprise a hollow tubular portion mounted at one end in a rotatable collar 69 forming the forward end of holder 72. An arm 83 rigidly fixed to the collar serves as a convenient means for rotating the entire lens assembly. As will later become apparent a lens system (not shown) is mounted in the outer section of the hollow tubular portion. By movement of any suitable means, such as a knob 84, a screw threaded pin 85 mounted in a housing 86 attached to the upper part of holder 72 functions to rotate the lens assembly counterclockwise as shown in Fig. 7. Bearing upon the opposite side of arm 83 meanwhile is a resiliently mounted pin member 87 contained in housing 88 attached to the upper part of holder 72 and serving to hold the lens assembly in the desired angular position.

As will thus be noted, the lens assembly 73 is therefore capable of adjusted movement in any of three planes whereby it may be coordinated with the setting of its companion lens assembly 133, later to be described.

For the purpose of holding in a prescribed position within holder 72 the record to be projected through the lens assembly, as for example a selected picture on an elongated film 90 such as shown in Figs. 3 and 5, various means may be employed. One such means may comprise a flat transparent plate 91 affixed to the rear of holder 72 and against which the front surface of the film closely fits. In order to provide for ease of positioning and holding the film a resiliently mounted apertured backing frame 92 having a glass partition 93 thereon adapted to bear against the rear surface of the film may be used. Springs 94 not only provide a pivoted resilient mounting for frame 92 but also serve to hold partition 93 against the film without damage to such film. For the purpose of permitting ready adjustment of the film a depending extension 95 on frame 92 may be engaged with a lever arm 96 pivotally mounted at 97 upon the side of holder 72 and tilted against the action of springs 94. A conventional thumbscrew 98 bears upon one side of lever 96 for effecting the desired movement of the backing frame.

One convenient arrangement for compactly assembling the holder 72 and its associated structure generally as a unit may employ a cantilever support 110 fastened at one end to the lower portion of the lens holder 72 and movable as a unit therewith. It will be understood, however, that such associated structure may be mounted separately and adjustably upon base plate 26 without departing from our invention. The support 110 may mount adjacent the film 90 a condenser lens assembly indicated at 111 and comprising one or more lenses whose function is to focus upon said film a beam of light. Located adjacent the free end of support 110 is an adjustable gimbal structure having a bracket 112 affixed thereto. A second bracket 113 is mounted for turning movement about pivot points 114 and 115 in bracket 112. Mounted upon bracket 113 for turning movement about a pivot 116 is a clamp 117 adapted to hold securely a lamp assembly generally indicated at 118. It will be understood that any suitable lamp with necessary connections to an electrical circuit and switches therefor will be fitted into assembly 118, but since the precise nature of the same forms no essential part of the invention it is not shown herein. As best shown in Fig. 5, a suitable arm 119 fastened to bracket 112 cooperates with a second arm 120 fastened to bracket 113 through the intermediary of a threaded thumbscrew 121 engaging both said arms to provide for tilting of the gimbal in a vertical plane about pivots 114 and 115. By a somewhat similar arrangement an arm 122 affixed to bracket 113 cooperates with a second arm 123 affixed to clamp 117 through the intermediary of a second threaded thumbscrew 124 engaging both arms to provide for rotation of the clamp and its associated lamp assembly about pivot point 116. As will now be apparent, the invention thus provides upon the adjustable base plate 26 an arrangement whereby one grouping of the projector assembly mounted in turn upon the adjustable plate 40 can be moved to a desired general projecting direction. In addition, the movable holder 72 carries with it an individual projector combination for that grouping which is mounted upon the support 110 and the projecting light means associated therewith moreover is capable of independent adjustment in two planes.

Having thus disclosed the preferred construction of one grouping of the projector assembly, reference is made to Fig. 5 showing the complementary grouping of the assembly mounted upon support plate 41 and comprising a hollow, box-like holder 130 pivotally mounted upon rigid supports 131 and 132 attached to said plate. A suitable lens assembly 133 may be fitted within one end of said holder by means of collar 137 and a flat transparent plate 134 against which the front surface of film 90 fits may be attached at the other end of the holder. In order to provide for ease of positioning the film an apertured backing frame 135 containing a glass partition 136 bearing against the rear surface of the film may also be used, the construction and operation of which is similar to that of frame 92 and its associated parts. Since the grouping mounted upon plate 41 is intended to be the initial grouping to be adjusted in the operation of the apparatus and the grouping mounted upon plate 40 is later referred to as said initial grouping, no additional means for rotating the holder 130 in a horizontal plane is provided nor is any means for rotating the lens assembly 133 within holder 130 required. If, however, such additional adjustments should be desired for special purposes the same may be used without in any way departing from our invention. In the usual case, however, a cantilever support, 140, similar in construction and purpose to support 110, is fastened to the lower portion of holder 130 and provides a mount for a condenser lens assembly 141, and a gimbal for adjustably retaining the lamp assembly 142, the adjustment of which preferably is similar to that of lamp assembly 118.

For interrupting the beams of light directed upon the film 90 separate shutter means 143 and 144 pivoted at 145 and 146 and normally held in closed position by an actuating means such as springs 147 and 148 may be used. Any suitable connections for positively moving each shutter may be provided, as for example the solenoids 151, 152, 153 and 154 actuated by an electrical circuit and push button controls (not shown). Moreover, a suitable housing 149, having a cover pivoted as at 150, may be attached to plate 26 for enclosing the several parts of the projecting apparatus and for giving access thereto for adjustments.

As indicated in Figs. 3 and 4, a conventional pantograph structure rigidly anchored by plate 160 upon extension 28 of table frame 27 is adapted to move freely in a horizontal plane parallel to said table frame. One leg 161 of this apparatus is pivoted as at 162 to a second leg 163 carrying in turn the inner calibrated portion 164 of a protractor and a knurled knob 173 which provides ease of movement. The outer portion 165 of the protractor desirably is attached to a heavy base unit 166, preferably of square dimensions, which is adapted initially to rest upon table top 20 at a selected position and to give at all times mechanical support to a vertical post 167 rigidly affixed to the base unit. By means of a pinion actuated by the manually operated wheel 168 a rack 169 may be raised or lowered with respect to post 167 and a scale with suitable gradations may be provided to indicate the height above table top 20. Near its top the rack 169 may have a pillow block 170 providing a bearing for a transverse shaft 171 which can be retained in a desired angular position by means of set screw 172.

Shaft 171 provides a support for a thin, flat transparent measuring and viewing screen 175 which may have a ground glass surface and be provided with reference markings 182 similar to those employed on the glass surface 9 of the top of cloud chamber 8. Any desired number and arrangement of markings may be employed for centering the stereopair view even though the view taken by the camera frequently is of circular form. Suitable crosshairs 183 likewise are provided upon the screen for a purpose later to be described. A protractor 176 rigidly mounted upon pillow block 170 adjacent the edge of screen 175 provides a ready means for measuring the angular displacement of said screen from a horizontal plane. Moreover, since the plane of screen 175 is free to rotate through 360° in a horizontal plane as well as to rotate through 180° in a vertical plane it thus becomes possible to adjust its surface to a line drawn anywhere in three dimensional space within its limits of movement.

Having thus described the construction of a preferred form of apparatus suitable for carrying out the invention, it will be readily apparent that other forms may be employed without departing from the teachings of the same. Also, in the operation of the apparatus for practicing the method of the invention it will be observed that certain sequences of adjustments are desirable for most efficient usage, although the sequences likewise may be modified without departing from the invention.

Assuming first that a stereopair has been exposed showing a phenomenon occurring in cloud chamber 8 and which it is desired to view and directly measure in its full scale size, the stereopair would then be developed in the form of a film 90. As is customary in the art, a series of stereopairs are usually taken in sequence whenever a burst of particles are directed into a cloud chamber and accordingly an elongated film 90 is the conventional record obtained. Assuming further that the optical distances and conditions under which the stereopair was taken are those as indicated diagrammatically in Figs. 1 and 2, and that the lenses employed in the lens assemblies 73 and 133 would approximate as closely as possible the optical properties of the lens assemblies found in camera lenses 15 and 16, the operator then is ready to utilize fully the advantages of the invention.

Upon positioning one member of a stereopair in the lens holder 130 serving as the reference holder, the holder and its associated structure is then adjusted so as to direct a first image upon screen 175, which at this time is positioned at a standard distance above and parallel to table top 20, such as distance $e$ in Fig. 4. Base plate 26 is then adjusted lengthwise of tracks 25 and lens assembly 133 is moved to a position such that the markings of the first image exactly coincide with the markings 182 on screen 175, thus giving a picture of the correct size. At this time the geometry under which this particular stereopair image was viewed by the camera is exactly duplicated in the projector. For example, the space through air traveled by the rays of light passing to screen 175 are equal to a distance equivalent to distance $b$ of Fig. 1, or to the sum of distances $c$, $d$, and $e$, of Fig. 2, it being understood in this circumstance that the optical effect of the passage of such rays through glass table top 20 is equivalent to the effect of passage through the top surface 9 of the cloud chamber and that the image viewed by looking through the thin screen 175 forms no parallax. Moreover, for purposes of measuring, the position of screen 175 at this time is equivalent to a position at the inner surface of glass top 9 of the chamber at the instant the photographed phenomenon occurred.

Figure 10:
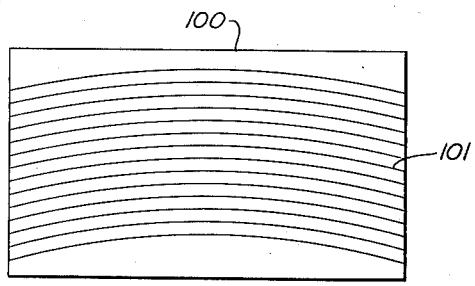
Fig. 10 is a plan view of one form of template suitable for use with the viewing screen.

Having thus focused one member of the stereopair on the screen, steps are then taken to superimpose thereon the other member of the stereopair, with its markings coinciding with the markings 182 on screen 175. In so doing, holder 72 is adjusted in a vertical plane, if necessary, as by means of knob 80 and arm 76; in a horizontal plane, if necessary, as by means of knob 55 and web 52; and the lens assembly per se may be rotated in a third plane, if necessary, as by means of knob 84 and arm 83. Upon providing these adjustments it will be observed that the centers of lens assemblies 73 and 133 will then be separated at a distance $a$ (shown in Figs. 3 and 5) which is substantially the same distance $a$ separating lenses 15 and 16 of the camera at the instant the film was exposed. As will be apparent, the gimbals supporting lamp assemblies 118 and 142 may likewise be adjusted to provide the most efficient beam of light for transmission through the condenser lenses 111 and 141 during the above-mentioned adjustments. Likewise, any necessary manual adjustments of film 90 for the purpose of centering the same in the respective lens holders, can be made at any time merely by operating the backing frames 92 and 135 to secure the proper spacing of the respective units of the stereopair. With the above reference positions of the superimposed images thus established upon the screen, it probably will be found in the cases in which the stereopair shows an ion path, that the paths shown by the two images are separated throughout their length. In this event screen 175 is then raised upon post 167 to a distance at which the two images coincide at one point, preferably in the direction from which the ion beam actually entered the cloud chamber. It will be observed that the actual distance through which said screen is so raised is an actual measurement of the distance within the cloud chamber below its top surface 9 at which the observed phenomenon actually occurred. Having thus determined the true focused location of one point of both images, the cross-hairs 103 of screen 175 are then brought to bear upon this point by movement of base unit 166 upon table top 20, and the screen is then rotated upon protractor 164 to a position at which one cross-hair substantially bisects the angle between the diverging images. Thereupon screen 175 is tilted about shaft 171 until the two images are recomposed into a single image along their entire length. This recomposed image is neither foreshortened nor attenuated but represents an actual view in full scale size of the phenomenon which was photographed. When a measurement rather than a mere observation of this image is desired, it may be secured merely by laying a suitable template 100, such as shown in Fig. 10, over the screen 175 and a direct measurement can then be taken of the length, direction, or width of ion path. Template 100 may conveniently contain reference data lines 101 showing radii of curvatures, lengths of paths, thicknesses of paths, or other criteria which it is desired to measure directly. It will be noted that in addition to the fact that the distance through which screen 175 was raised measures a distance downwardly in the cloud chamber, the measurement of the angle on protractor 176 indicates the angle at which a path extends downwardly or upwardly within such chamber, the measurement of the angle on protractor 164 indicates the angle at which a path extends sideways from the direction of the ion beam, and the length of the recomposed path is a true reproduction in full scale size of the actual path taken in the three-dimensional space in the cloud chamber.

The sequence of operations of the apparatus above described may be varied if desired without departing from the invention, so long as the conditions of duplicate geometry are observed, and it is not to be inferred that other sequences of operations are excluded.

Furthermore, it will be observed that due to the use of the reflecting means 30 it is possible to provide for convenient measuring and adjusting during such operation. Due to the table-like structure, the operator can look upon screen 175 in a direction normal to its surface without parallax distortion and at the same time can effect rapid manual adjustments in the projectors, if desired. One important advantage is that observations of cloud chamber records, which heretofore have been tedious and conducive to eye strain, especially when the observer was compelled to study the data under physically awkward postures, may now be avoided.

Having thus described our invention, it will be apparent that numerous modifications may be made within the scope and intent thereof, and we do not limit the invention to the exact details shown herein except as they may be defined in the following claims.

What is claimed is:

1. In a stereoscopic image-recomposing apparatus, a stereopair, first and second projector groupings reproducing first and second images from said stereopair under optical conditions substantially identical with the optical conditions under which the stereopair was produced, a planar screen upon which said images are recomposed into a full size single image, a vertical extensible post supporting said screen for movement therealong in a vertical plane, a base member freely movable about a plane transverse to the direction of projection of said images and holding said post, and a shaft journalled in the extensible portion of said post and supporting the screen for rotational movement transversely of said post whereby the plane of the screen may be positioned in three-dimensional space and the recomposed image may be focused thereon in the true size.

2. A stereoscopic image-recomposing apparatus including, a stereopair, first and second projector groupings, adjusting means connected to said groupings for positioning the same in order to reproduce first and second images from said stereopair under optical conditions substantially identical with the optical conditions under which the stereopair was produced, a planar screen upon which said images are recomposed into a full size single image, a transparent table top through which said images are projected, a pantograph assembly affixed to said table top and movable in a substantially horizontal plane, a base member rotatably connected to the free end of said pantograph and supported upon said table, a vertical post positioned upon said base member, a vertically movable member mounted upon said post, a transverse shaft journalled in said member and adapted to support said screen, and means for retaining said screen in a selected tilted position with respect to said vertical post, whereby the plane of such screen may be positioned in three-dimensional space and the recomposed image may be focused thereon in its true size.

3. A stereoscopic image-recomposing apparatus including, a stereopair, first and second projector groupings, adjusting means connected to said groupings for positioning the same in a horizontal plane in order to reproduce converging first and second images from said stereopair under optical conditions substantially identical with the optical conditions under which the stereopair was produced, a reflector directing said images in a vertical direction, a transparent horizontally arranged table top through which said converging images are reflected, a planar screen upon which said images are recomposed into a full size single image, a pantograph assembly affixed to said table top and movable in a substantially horizontal plane, a base member rotatably connected to the free end of said pantograph and supported upon said table top, a vertical post positioned upon the base member, a vertically movable member mounted upon said post, a transverse shaft journalled in said member and adapted to support said screen, and means for retaining said screen in a selected tilted position with respect to said vertical post whereby the plane of such screen may be positioned in three-dimensional space and the recomposed image may be focused thereon in its true size.

4. The method of stereoscopically recomposing upon a screen a full-scale image of stereoscopically photographed paths of ions traveling angularly with respect to the plane of the film of a stereoscopic camera, comprising producing a film stereopair of such paths of ions under a given set of optical conditions, stereoscopically projecting overlapping images of said stereopair upon a screen disposed transversely of the direction of projection and under optical conditions identical with the first-mentioned optical conditions, and rotating said screen from such transverse postion until the images are completely superimposed and thereby shown in full scale.

5. The method of stereoscopically recomposing an image upon a screen comprising projecting light simultaneously through a film stereopair containing images of the paths of ions traveling angularly with respect to the plane of such film, forming two separate and converging views of such images upon a screen disposed transversely of the direction of projection with at least one point of the first image superimposed upon the identical point of the other image, and rotating said screen about an axis containing said superimposed points until the remainder of one of said views is superimposed upon the other on said screen.

6. The method of stereoscopically recomposing a full-scale image upon a screen movable in three-dimensional space comprising projecting light simultaneously through a film stereopair containing images of an object extending angularly with respect to the plane of such film and forming two separate views of the object, focusing said views upon a screen held in an initial position transverse to the direction of projection, adjusting the position of said screen along the direction of projection until at least one point of one view is superimposed on the same point of the other view, and rotating said screen about an axis containing said superimposed points until the remainder of one of said views is superimposed upon the other on said screen.

7. The method of stereoscopically recomposing a full-scale image upon a screen movable in three-dimensional space comprising projecting light simultaneously through a film stereopair containing images of an object extending angularly with respect to the plane of such film and forming two separate and converging views of the images, reflecting said separate views upon a screen held in an initial position transverse to the direction of reflection, moving the screen along the path of reflection until at least one point of one view is superimposed upon the same point of the other view, and rotating said screen about an axis containing said superimposed points until the remainder of one of said views is superimposed upon the other on said screen.

8. The method of stereoscopically recomposing upon a screen a full-scale image taken under a given set of optical conditions comprising projecting light simultaneously through a film stereopair containing images of a path of ions traveling through a cloud chamber at an angle with respect to the plane of said film and forming two separate and converging views of said image, focusing said views upon a screen held in an initial position transverse to the direction of projection, reproducing the original set of optical conditions by adjustment of the distance of said screen from said stereopair along the direction of projection, adjusting the position of said views until at least one point of one view is superimposed upon the same point of the other view, and rotating said screen about an axis containing said superimposed points until the remainder of one of said views is superimposed upon the other on said screen.

9. The method of stereoscopically recomposing upon a screen a full-scale image comprising producing a film stereopair of the paths of ions traveling angularly with respect to the plane of the film of a stereoscopic camera through a cloud chamber and under a given set of optical conditions, projecting light through a first member of said stereopair and directing the image upon a screen disposed transversely of the direction of projection, reproducing the original set of optical conditions for the image of said first member by a selective adjustment of the distance between said screen and first member along the direction of projection, projecting light through the second member of the stereopair and separately adjusting the focus of said second member in order to direct the separate views of the image of the two members upon the screen with at least one point of one view superimposed upon the same point of the other view, and rotating said screen about an axis containing said superimposed points until the remainder of one of said views is superimposed upon the other on said screen.

10. A stereoscopic image-recomposing apparatus having in combination, a stereopair containing two spaced-apart images, a first projector, a second projector, each projector being adapted independently to project a single image of the stereopair, a reflector against which the projected images are directed, a planar screen adjustable along three dimensions and rotatable in three-dimensional space in the path of the images from said reflector, and a transparent-top table disposed between said reflector and screen, said screen being supported on said table and adjustable with respect thereto by means of an elevating structure, whereby the reflected image from one projector may be superimposed at the surface of the screen upon the reflected image from the other projector and focused uniformly at all portions of the image.

11. A stereoscopic image-recomposing apparatus having in combination, a stereopair containing two spaced-apart images, a first projector, a second projector, each projector being adapted independently to project a single image of the stereopair, a reflector against which the projected images are directed, a planar screen adjustable along three dimensions and rotatable in three-dimensional space in the path of the images from said reflector, and a transparent-top table disposed between said reflector and screen, said screen being supported on said table with adjustable means provided for rotating the screen horizontally with respect to said table, whereby the reflected image from one projector may be superimposed at the surface of the screen upon the reflected image from the other projector and focused uniformly at all portions of the image.

12. A stereoscopic image-recomposing apparatus having in combination, a stereopair containing two spaced-apart images, a first projector, a second projector, each projector being adapted independently to project a single image of the stereopair, a reflector against which the projected images are directed, a planar screen adjustable along three dimensions and rotatable in three-dimensional space in the path of the images from said reflector, and a transparent-top table disposed between said reflector and screen, said screen being supported upon said table and provided with an elevator means for adjusting the screen vertically with respect to said table, with means supported upon said table for rotating the screen horizontally with respect to said table, and with means attached to said elevator means for rotation of the screen about an established vertical setting thereof, whereby the reflected image from one projector may be superimposed at the surface of the screen upon the reflected image from the other projector and focused uniformly at all portions of the image.

13. In a stereoscopic image-recomposing apparatus, a stereopair, first and second projector groupings reproducing first and second images from said stereopair under optical conditions substantially identical with the optical conditions under which the stereopair was produced, a calibrated base member freely movable about a plane transverse to the direction of projection of said images, a calibrated and extensible post mounted vertically upon said base, a shaft rotatably journaled in the extensible portion of said post and extended transversely therefrom, and a planar screen supported by said shaft whereby the plane of the screen may be adjusted in three-dimensional space and a recomposed single image may be focused thereon in true dimensions.

WILSON M. POWELL.
HERMAN PAUL HERNANDEZ, Jr.

References Cited in the file of this patent

UNITED STATES PATENTS

| Number | Name | Date |
| --- | --- | --- |
| 1,392,475 | Bingham | Oct. 4, 1921 |
| 1,396,047 | Nistri | Nov. 8, 1921 |
| 1,654,070 | Corlett et al. | Dec. 27, 1927 |
| 1,666,304 | Proctor | Apr. 17, 1928 |
| 1,713,498 | Cooke | May 14, 1929 |
| 1,797,066 | Zimmer | Mar. 17, 1931 |
| 1,816,181 | Eliel | July 28, 1931 |
| 1,909,923 | Von Bertrab | May 16, 1933 |
| 1,916,487 | Nistri | July 4, 1933 |
| 1,937,711 | Nelles et al. | Dec. 5, 1933 |
| 1,980,981 | Cooke | Nov. 20, 1934 |
| 2,104,778 | Talley | Jan. 11, 1938 |
| 2,238,207 | Ames et al. | Apr. 15, 1941 |
| 2,266,833 | Waldeyer | Dec. 23, 1941 |
| 2,444,815 | Edison | July 6, 1948 |
| 2,451,031 | Kelsh | Oct. 12, 1948 |
| 2,492,870 | Kelsh | Dec. 27, 1949 |
| 2,506,131 | Bonnet | May 2, 1950 |

FOREIGN PATENTS

| Number | Country | Date |
| --- | --- | --- |
| 27,653 | Great Britain | 1910 |
| 306,385 | Germany | July 20, 1931 |
| 452,004 | Great Britain | Aug. 14, 1936 |